United States Patent

Hachisuka et al.

Patent Number: 5,709,733
Date of Patent: Jan. 20, 1998

[54] GAS SEPARATION METHOD

[75] Inventors: Hisao Hachisuka; Kenichi Ikeda; Kenichi Inoue, all of Osaka, Japan

[73] Assignee: Nitto Denko Corporation, Osaka, Japan

[21] Appl. No.: 654,570

[22] Filed: May 29, 1996

[30] Foreign Application Priority Data

May 29, 1995 [JP] Japan .................. 7-130341

[51] Int. Cl.$^6$ .................. B01D 53/22
[52] U.S. Cl. .................. 95/51; 95/45
[58] Field of Search .................. 95/39, 45, 47–55

[56] References Cited

U.S. PATENT DOCUMENTS

| | | | |
|---|---|---|---|
| 4,705,540 | 11/1987 | Hayes | 95/51 |
| 4,717,394 | 1/1988 | Hayes | 95/51 X |
| 4,741,744 | 5/1988 | Wu et al. | 95/51 X |
| 4,793,829 | 12/1988 | Pan et al. | 95/47 |
| 4,859,215 | 8/1989 | Langsam et al. | 95/51 |
| 4,936,887 | 6/1990 | Waldo et al. | 95/51 X |
| 4,990,168 | 2/1991 | Sauer et al. | 95/51 X |
| 5,007,944 | 4/1991 | Pinnau et al. | 95/51 |
| 5,055,116 | 10/1991 | Kohn et al. | 95/51 X |
| 5,073,356 | 12/1991 | Guro et al. | 423/415 |
| 5,082,481 | 1/1992 | Barchas et al. | 95/51 X |
| 5,089,033 | 2/1992 | Wijmans | 95/39 |
| 5,165,963 | 11/1992 | Matsumoto et al. | 95/51 X |
| 5,185,014 | 2/1993 | Prasad | 55/16 |
| 5,207,806 | 5/1993 | Lagree et al. | 55/16 |
| 5,234,471 | 8/1993 | Weinberg | 95/51 X |
| 5,286,280 | 2/1994 | Chiou | 95/51 X |
| 5,290,341 | 3/1994 | Barbe | 95/54 |
| 5,538,536 | 7/1996 | Fuentes et al. | 95/51 X |
| 5,591,250 | 1/1997 | Stern et al. | 95/51 |

FOREIGN PATENT DOCUMENTS

| | | | |
|---|---|---|---|
| 1188630 | 6/1985 | Canada | 95/51 |
| 49-037899 | 4/1974 | Japan | 95/39 |
| 56-40417 | 4/1981 | Japan . | |
| 61-120614 | 6/1986 | Japan . | |
| 2-124702 | 5/1990 | Japan . | |
| 4-180811 | 6/1992 | Japan . | |
| 4-265107 | 9/1992 | Japan . | |
| 4-284814 | 10/1992 | Japan . | |
| 4-349103 | 12/1992 | Japan . | |
| 5-221608 | 8/1993 | Japan . | |
| 5-253438 | 10/1993 | Japan . | |
| 6-099013 | 4/1994 | Japan . | |
| 6-099034 | 4/1994 | Japan . | |
| 6-099035 | 4/1994 | Japan . | |
| 6-170146 | 6/1994 | Japan . | |
| 6-210120 | 8/1994 | Japan . | |
| 6-220468 | 8/1994 | Japan . | |
| 6-227803 | 8/1994 | Japan . | |
| 2174379 | 11/1986 | United Kingdom | 95/51 |
| 2 272 430 | 5/1994 | United Kingdom . | |

OTHER PUBLICATIONS

Haraya, et al., "Feasibility Study of the Application of Membrane Separation in $CO_2$ Removal from Flue Gases", Kagaku Kougaku Ronbunshu vol. 19, No. 5 (1993), pp. 714–721.

*Primary Examiner*—Robert Spitzer
*Attorney, Agent, or Firm*—Merchant, Gould, Smith, Edell, Welter & Schmidt, P.A.

[57] ABSTRACT

A method of separating a gas, especially carbon dioxide, from a gas mixture of the gas and nitrogen at a low temperature of −20° C. to 50° C. using a gas separation membrane permeable to the gas, including the step of cooling the gas mixture using at least one cooling medium selected from the group consisting of liquefied petroleum gas and liquefied natural gas. The liquefied petroleum gas comprises at least one selected from the group consisting of propane gas and butane gas in an amount of more than 50 vol. %. The gas separation membrane has a $CO_2$ permeation rate of $1 \times 10^{-4}$ to $5 \times 10^{-2}$ N cm$^3$/(cm$^2$cm Hg sec) at 25° C. and a $CO_2/N_2$ separation factor of 10 to 200 at 25° C.

12 Claims, 3 Drawing Sheets

GAS SEPARATION METHOD

FIELD OF THE INVENTION

The invention relates to a method of separating a specific gas from a gas mixture of at least two gases at low temperatures using a gas separation membrane permeable to the specific gas.

BACKGROUND OF THE INVENTION

From the viewpoint of environmental concerns or energy-saving, there are various ways of gas separation to recover or concentrate a specific gas such as carbon dioxide, methane, oxygen, nitrogen or hydrogen from a gas mixture. Conventional gas separation included the low-temperature process and the adsorption process. In addition, a process using polymer films is proposed for recover-concentrating gasses in JP Published Unexamined Patent Application (Kokai Tokkyo Koho) Nos. SHO56(1981)-40417, SHO61 (1986)-120614, HEI02(1990)-124702, HEI04(1992)-349103, HEI04(1992)-265107, HEI06(1994)-099013, HEI06(1994)-099034, HEI06(1994)-099035, HEI05(1993)-253438, HEI05(1993)-221608, HEI06(1994)-210120, HEI06(1994)-227803, HEI06(1994)-170146 and HEI06 (1994)-220468.

High permeability of the separation membrane to the intended gas and reduction of operation costs are required for gas separation modules which separate and concentrate carbon dioxide, methane, oxygen, nitrogen or hydrogen from a mixture containing gaseous ingredients. JP Published Unexamined Patent Application No. SHO61(1986)-120614 discloses a method in which a permeation site is heated with heat generated in a vacuum pump to improve permeability of membranes and to reduce operation costs. This method was not practical because the permeability was reduced due to heating. JP Published Unexamined Patent Application No. SHO56(1981)-040417 discloses a device to control the temperatures of a gas mixture and a gas separation module and to improve permeation performance of the module. This method was also impractical because the permeation performance was reduced with increasing operation costs in connection with the thermal control.

For separation of small molecules such as oxygen or nitrogen and large molecules such as vaporized polymers, systems for cooling a separation membrane and fed vapor by a cooling unit using cooling water or the like are proposed in JP Published Unexamined Patent Application Nos. HEI04 (1992)-284814 and HEI04(1992)-180811. The systems can improve safety by reducing the temperature of an inflammable vaporized polymer below the flash point of the polymer. The systems can also condense and recover vapor of organic solvents. However, the systems were not useful for improving permeability of the membrane, though safety and gas separation performance were improved by cooling the system. In other words, gas separation modules should be treated at low temperatures, but that is impractical and less economical because permeation performance is reduced.

SUMMARY OF THE INVENTION

To solve the above-noted problems, the invention aims to provide a practical gas separation method using a gas separation membrane realizing high separation and permeation performance.

To attain the aim, the invention provides a method of separating a gas from a gas mixture containing the gas to be separated and at least one other gas at a low temperature using a gas separation membrane permeable to the gas, comprising the step of cooling the gas mixture and/or the gas separation membrane using at least one cooling medium selected from the group consisting of liquefied petroleum gas and liquefied natural gas. The gas mixture and/or the gas separation membrane is effectively cooled with the heat of vaporization due to the cooling medium evaporating. The low temperature is in the range of preferably −20° C. to 50° C., more preferably 0° C. to 30° C.

The gas separation membrane preferably has a polymer layer and an elastomer polymer layer laminated on the polymer layer. The polymer layer actually serves to separate an intended gas. The polymer layer, usually in a thickness of 20 to 30 μm, is preferably formed of a material selected from the group consisting of silicone resin, polytrimethylsilylpropyne, cellulose acetate, polycarbonate, polysulfone, polyimide and fluorine-containing polyimide. To protect the surface of the polymer layer, the elastomer polymer is embedded in holes on the surface of the polymer layer, which were generated during the film-forming process. The elastomer polymer layer, usually in a thickness of 0.2 to 30 μm, is preferably formed of crosslinkable silicone resin. Such crosslinkable silicone resin is soluble in organic solvents before crosslinking, and once crosslinked, the silicone resin can no longer dissolve in organic solvents.

It is preferable that the gas mixture comprises carbon dioxide and nitrogen, and carbon dioxide is separated from nitrogen using the gas separation membrane. However, the gas mixture does not necessarily contain nitrogen.

The gas separation membrane preferably has a permeation rate of $1 \times 10^{-4}$ to $5 \times 10^{-2}$ N cm$^3$/(cm$^2$cm Hg sec) for carbon dioxide at 25° C. and a separation factor of 10 to 200 for carbon dioxide and nitrogen at 25° C., more preferably a permeation rate of $2 \times 10^{-4}$ to $5 \times 10^{-3}$ N cm$^3$/(cm$^2$cm Hg sec) for carbon dioxide at 25° C. and a separation factor of 20 to 100 for carbon dioxide and nitrogen at 25° C.

It is preferable that the liquefied petroleum gas comprises at least one selected from the group consisting of propane gas and butane gas in an amount of more than 50 vol. %. The liquefied petroleum gas can contain propylene gas, butadiene gas, methane gas, ethane gas and/or ethylene gas in an amount of less than 50 vol. %.

It is preferable that the method further comprises the step of contacting the gas mixture with a pipe through which the cooling medium is passing while the cooling medium is evaporate to cool the gas mixture.

It is preferable that the method further comprises the steps of contacting a liquid with a pipe through which said cooling medium is passing while said cooling medium is evaporating, cooling the liquid, and cooling at least one selected from the gas mixture and the gas separation membrane using the liquid.

It is preferable that the liquid is at least one selected from water and alcohol.

It is preferable that the gas separation membrane is in a form selected from the group consisting of spiral element, hollow yarn element, capillary element, tubular element and flat membrane element.

It is preferable that the gas separation membrane is supported by at least one article selected from the group consisting of glass plate, porous body, woven fabric and unwoven fabric, which is formed of organic materials and/or inorganic materials. The supporting article provides the separation membrane with physical strength.

DETAILED DESCRIPTION OF THE PREFERRED EMBODIMENTS

Figure 1:
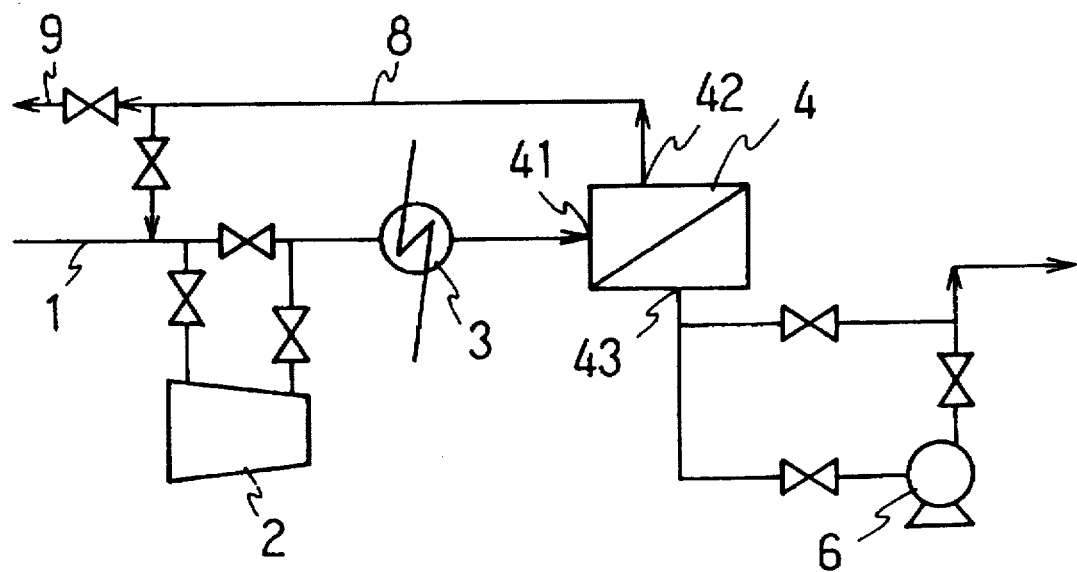
FIG. 1 is a flow chart for the gas separation of Example 1.

The gas separation method of the invention separates a specific gas from a gas mixture containing, for example, carbon dioxide, methane, oxygen, nitrogen and/or hydrogen. Carbon dioxide, methane and nitrogen can have a large solubility for materials of gas separation membranes. Such gases need reduced activation energy to permeate the gas separation membrane.

Permeation rates P [N cm$^3$/(cm$^2$cm Hg sec)] for carbon dioxide are determined by measuring the pressure of carbon dioxide permeating a separation membrane into a constant volume with time using a pressure gauge such as a Baratoron pressure transducer and calculating a value according to the following equation:

$$P = (273/T) \cdot (V/A) \cdot (1/p) \cdot (1/760) \cdot (dH/dT)$$

wherein T is the absolute temperature (K), V is the volume (cm$^3$) of the post-permeation side of a gas separation membrane, A is the area (cm$^2$) of the membrane permeated by a gas, p is the carbon dioxide gas pressure (cm Hg), and (dH/dT) is the inclination of a line (mm Hg/sec) obtained from a permeation curve in a standard state.

Separation factors for carbon dioxide and nitrogen are determined by calculating a ratio of a $CO_2$ permeation rate $P_{CO_2}$ to an $N_2$ permeation rate $P_{N_2}$. $P_{CO_2}$ and $P_{N_2}$ are obtained in the above manner by singly using $CO_2$ and $N_2$, respectively.

Liquefied natural gas is prepared by removing impurities such as water content, sulfur or carbon dioxide from natural gas and liquefying the residue at an ultralow temperature, for example, −162° C. The temperature at which a specific gas is separated is selected depending on the properties or concentration of the gas mixture to be used. The temperature is preferably from −20° to 50° C. In particular, temperatures from 0° to 30° C. are suitable for using a gas mixture containing carbon dioxide and nitrogen. At below 0° C., water content in the gas mixture containing carbon dioxide and nitrogen may solidify, reducing the permeability of the membrane. At above 30° C., separation performance may be undesirably reduced.

The heat of vaporization refers to the heat that an evaporating material adsorbs from the environment. The use of the heat of vaporization in cooling is economical, and permits cooling to lower temperatures, compared with conventional cooling units using water or the like. The way of cooling a gas separation module using the heat of vaporization is not particularly limited. The heat of vaporization is used either directly or indirectly. The direct use is to contact a gas mixture with a pipe through which evaporating liquefied gas is passing, while the evaporating liquefied gas is cooling the pipe so that the gas mixture is cooled. The indirect use is to contact a liquid such as alcohol or water with a pipe through which evaporating liquefied gas is passing, with the evaporating liquefied gas cooling the pipe, and then introducing the cooled liquid to a cooling device as a heat exchanger so that the gas mixture and/or the gas separation membrane is cooled.

The preferred embodiments are explained with reference to the accompanying drawings. It should be understood that the invention is not limited to these specific embodiments.

EXAMPLE 1

A fluorine-containing polyimide comprising the unit represented by Formula 1 was prepared in the presence of ethylene glycol dimethylether as follows.

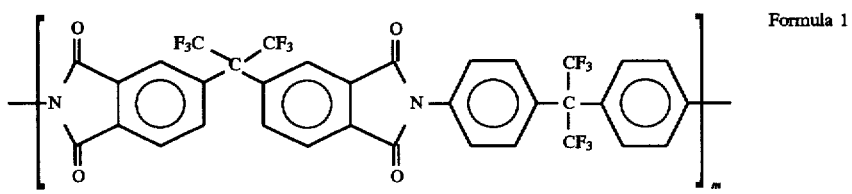

Formula 1 wherein m is 250.

2,2-Bis(4-aminophenyl)hexafluoropropane (BAAF, 0.75 mol) was dissolved in 1842 g of ethylene glycol dimethylether as an organic solvent. To the mixture was added 0.75 mol of 5',5-2,2,2-trifluoro-1-(trifluoromethyl)ethylidenebis-1,3-isobenzofurandion (6FDA) under nitrogen. The mixture was stirred at room temperature for 8 h to polymerize them and form poly(amic-acid). To the poly(amic-acid) was added 406 g of diethyleneglycol dimethylether. After the solution came to be homogeneous, 2.25 mol of pyridine as an imidation agent and 2.25 mol of acetic anhydride were added thereto. The mixture was stirred at room temperature for 12 h to carry out imidation. After that, the resulting solution was filtered to form a membrane forming solution. The filtrate was allowed to stand to sufficiently remove bubbles. The membrane forming solution was cast in a volume of 100 cm width, 15 m length and 130 μm thickness on a 100 μm thick polyester unwoven fabric using an applicator at 25° C. The cast solution was soaked in water at 30° C. for 1 h to solidify. The final thickness of the polymer film was 30 μm.

A solution of a crosslinkable silicone resin in hexane was applied in a thickness of 3 μm to the resulting gas separation membrane. The membrane was heated at 110° C. for 15 min to form a 3 μm thick film of elastomer polymer on the gas separation membrane. The above solution consisted of 97 wt. % hexane and 3 wt. % RTV615 (GE Silicones, General Electric Co.). A spiral element was formed by using the resulting gas separation membrane. The permeability of the membrane was examined using the element. The gas separation membrane exhibited a carbon dioxide permeation rate of 2.5×10$^{-4}$N cm$^3$/(cm$^2$cm Hg sec) or more at 25° C. and a carbon dioxide/nitrogen separation factor of 20.

FIG. 1 is a flow chart for the gas separation of this embodiment. Gas mixture 1 is compressed in compressor 2, and then cooled in cooling device 3 from 40° C. to 30°, 25°, 10° or 0° C. Gas mixture 1 is then introduced to gas separation module 4 through inlet 41. Gas separation module 4 accommodates the above gas separation membrane. Cooling system 3 uses the heat of vaporization of liquefied natural gas for cooling.

Pump 6 evacuates air to reduce the pressure at the post-permeation side of the gas separation membrane inside of module 4. The post-permeation side here refers to the section of module 4 which is defined by the gas separation membrane and near pump 6. The other side of module 4 which is defined by the gas separation membrane and near cooling system 3 is hereinafter referred to as the gas-feeding side. Gas mixture 1 introduced to module 4 contacts with the gas separation membrane. Carbon dioxide out of the gas mixture permeates the gas separation membrane due to the difference in pressure between the gas-feeding side and post-permeation side. After permeating the membrane, carbon dioxide is collected through outlet 43. On the other hand, non-permeating gas of the gas mixture flows out of module 4 through outlet 42 and passes through return tube 8. When carbon dioxide remaining in the non-permeating gas has more than predetermined concentration, the non-permeating gas mingles with a newly fed gas mixture. After mingling with a new gas mixture, the non-permeating gas is recycled to the gas separation module 4. When carbon dioxide remaining in the non-permeating gas has a predetermined concentration or less, the non-permeating gas is exhausted through exhaust tube 9.

The operation results of this embodiment were as follows; the $CO_2$ permeation rates P were $2.6 \times 10^{-4}$[N cm$^3$/(cm$^2$cm Hg sec)] at 30° C., $2.5 \times 10^{-4}$[N cm$^3$/(cm$^2$cm Hg sec)] at 25° C., $2.2 \times 10^{-4}$[N cm$^3$/(cm$^2$cm Hg sec)] at 10° C. and $2.0 \times 10^{-4}$[N cm$^3$/(cm$^2$cm Hg sec)] at 0° C.; and the $CO_2/N_2$ separation factor was 20 at 25° C.

On the contrary, the $CO_2$ permeation rate P at 40° C. without cooling the fed gas was $2.7 \times 10^{-4}$[N cm$^3$/(cm$^2$cm Hg sec)], and the $CO_2/N_2$ separation factor was 14.

The $CO_2$ permeation rates examined were almost the same between cases of cooling the fed gas and cases without cooling the fed gas. However, the $CO_2/N_2$ separation factor in cases of cooling the fed gas was much higher by 42% than the separation factor in cases without cooling the fed gas. Carbon dioxide was efficiently separated from nitrogen in the cooled gas mixture.

The results at 0° C., that is, the $CO_2$ permeation rate of $2.0 \times 10^{-4}$[N cm$^3$/(cm$^2$cm Hg sec)] and the $CO_2/N_2$ separation factor of 27, were found to satisfy the separation-permeation performance, specifically $3.35 \times 10^{-8}$ mols$^{-1}\cdot$m$^{-2}\cdot$Pa$^{-1}$ ($1 \times 10^{-4}$ cm$^3\cdot$s$^{-1}\cdot$cm$^{-2}\cdot$cm Hg$^{-1}$) reported by HARAYA et al. in "KAGAKU KOGAKU RONBUNSHU", vol. 19, no. 5 (1993), p.719. The separation of this embodiment was much improved, compared to the separation using the gas at 40° C. in the conventional manner.

EXAMPLE 2

Figure 2:
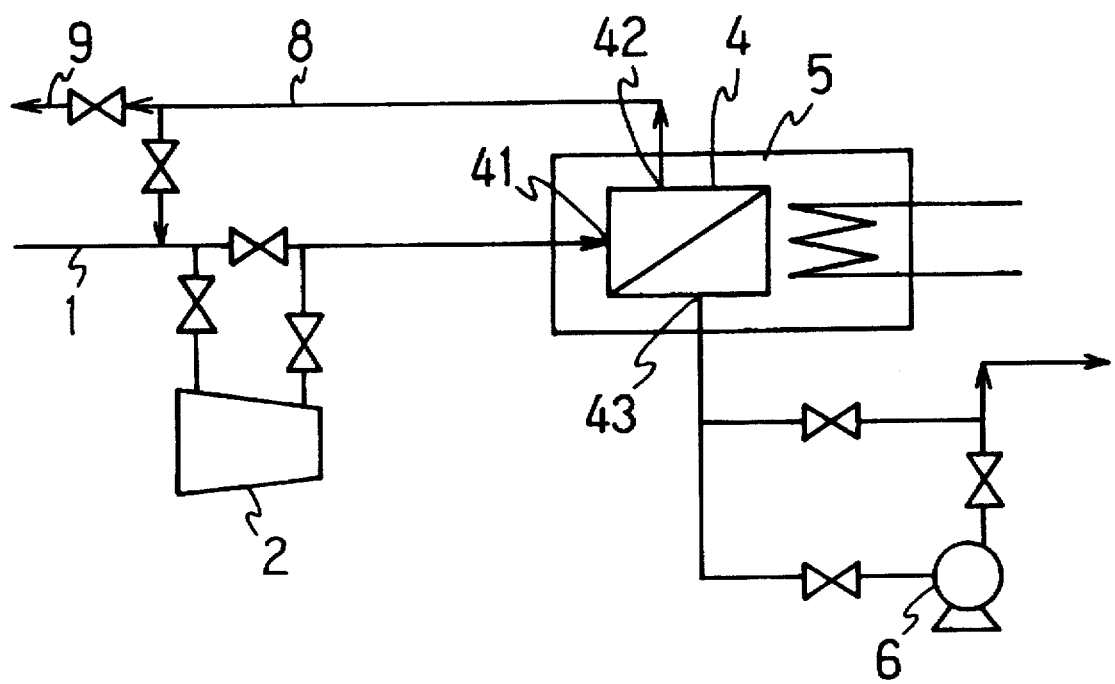
FIG. 2 is a flow chart for the gas separation of Example 2.

FIG. 2 shows a gas separation process in another embodiment. The gas separation system shown in FIG. 2 accommodates cooling device 5 instead of cooling device 3 shown in FIG. 1. Cooling device 5 uses liquefied natural gas to cool gas separation module 4 from the outside.

A gas mixture at 40° C. was introduced to gas separation module 4, which had been cooled by cooling device 5. The gas mixture was cooled in gas separation module 4 at 30°, 25°, 10° or 0° C. Carbon dioxide permeated the gas separation membrane.

This embodiment resulted in the same separation-permeation performance as in Example 1.

EXAMPLE 3

Figure 3:
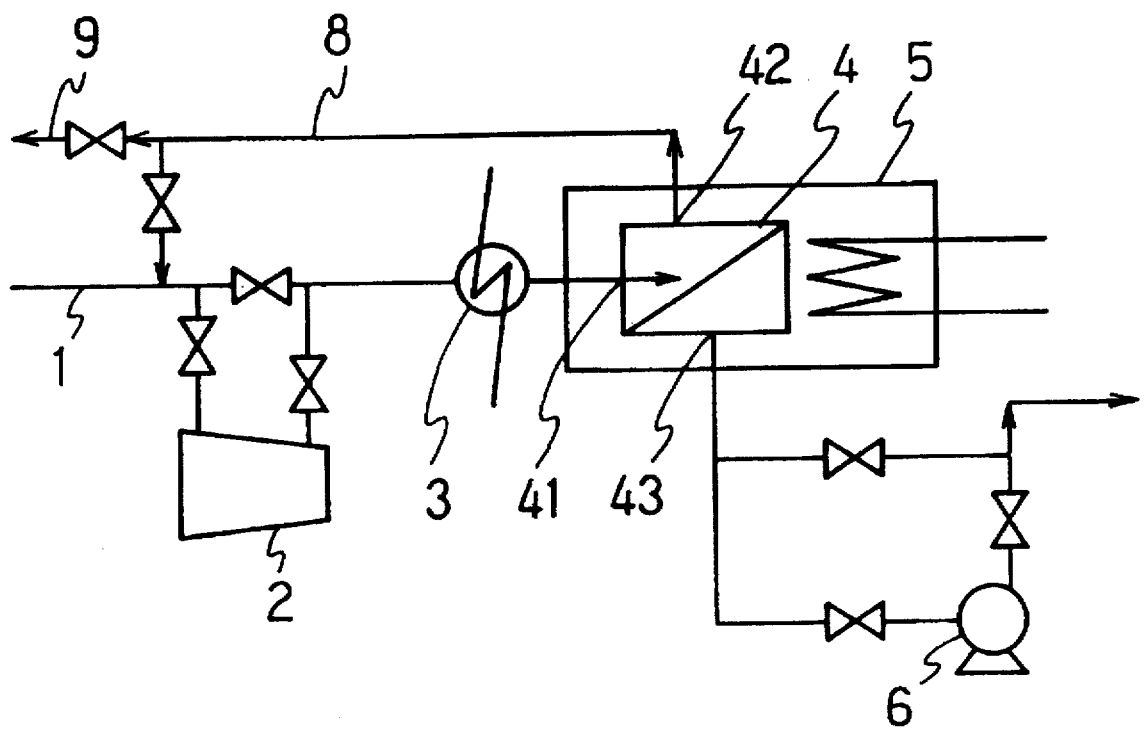
FIG. 3 is a flow chart for the gas separation of Example 3.

FIG. 3 shows a gas separation process in another embodiment. The gas separation system in FIG. 3 accommodates cooling devices 3 and 5. Cooling device 3 cools the gas mixture using liquefied natural gas. Cooling device 5 cools gas separation module 4 from outside using liquefied natural gas.

This embodiment resulted in the same separation-permeation performance as in Example 1. The embodiment was thought to be suitable for handling a large amount of gas mixture, such as 10,000N m$^3$/hr.

As explained above, the invention provides an economical and practical method of gas separation. In particular, carbon dioxide is sufficiently separated from a gas mixture comprising carbon dioxide and nitrogen. Therefore, the invention is especially useful for eliminating carbon dioxide from natural gas, substitute natural gas or exhaust gas (off gas) in thermal power plants, oil refining plants and natural gas refining plants.

The invention maybe embodied in other specific forms without departing from the spirit or essential characteristics thereof. The embodiments disclosed in this application are to be considered in all respects as illustrative and not restrictive, the scope of the invention being indicated by the appended claims rather than by the foregoing description, and all changes which come within the meaning and range of equivalency of the claims are intended to be embraced therein.

What is claimed is:

1. A method of separating a gas from a gas mixture comprising said gas at a low temperature using a gas separation membrane permeable to said gas, comprising the step of cooling at least one selected from said gas mixture and said gas separation membrane using at least one cooling medium selected from the group consisting of liquefied petroleum gas and liquefied natural gas, wherein said gas separation membrane comprises a polymer layer and an elastomer polymer layer laminated on said polymer layer, said polymer layer comprises a material selected from the group consisting of silicone resin, polytrimethylsilylpropyne, cellulose acetate, polycarbonate, polysulfone, polyimide and fluorine-containing polyimide, said elastomer polymer layer is formed of crosslinkable silicone resin, and said gas separation membrane has a permeation rate of $1 \times 10^{-4}$ to $5 \times 10^{-2}$N cm$^3$/cm$^2$cm Hg sec) for carbon dioxide at 25° C. and a separation factor of 10 to 200 for carbon dioxide and nitrogen at 25° C.

2. The method according to claim 1, wherein said gas mixture comprises carbon diozide and nitrogen, and carbon dioxide is separated from nitrogen using said gas separation membrane.

3. The method according to claim 1, wherein said liquefied petroleum gas comprises propane gas, butane gas or a mixture of propane gas and butane gas in an amount of more than 50% by volume.

4. The method according to claim 1, wherein said liquefied petroleum gas comprises at least one selected from the group consisting of propylene gas, butadiene gas, methane gas, ethane gas and ethylene gas in an amount of less than 50% by volume.

5. The method according to claim 1, further comprising the step of:

contacting said gas mixture with a pipe through which said cooling medium is passing while said cooling medium is evaporating to cool said gas mixture.

6. The method according to claim 1, further comprising the step of contacting a liquid with a pipe through which said cooling medium is passing while said cooling medium is evaporating to cool said liquid; and the step of cooling at least one selected from said gas mixture and said gas separation membrane being carried out by said liquid.

7. The method according to claim 6, wherein said liquid is at least one selected from water and alcohol.

8. The method according to claim 1, wherein said gas separation membrane has a permeation rate of $2 \times 10^{-4}$ to $5 \times 10^{-3} N$ $cm^3/(cm^2 cm$ $Hg$ $sec)$ for carbon dioxide at 25° C. and a separation factor of 20 to 100 for carbon dioxide and nitrogen at 25° C.

9. The method according to claim 1, wherein said low temperature is in the range of −20° C. to 50° C.

10. The method according to claim 1, wherein said low temperature is in the range of 0° C. to 30° C.

11. The method according to claim 1, wherein said gas separation membrane is in a form selected from the group consisting of spiral element, hollow yarn element, capillary element, tubular element and flat membrane element.

12. The method according to claim 1, wherein said gas separation membrane is supported by at least one article selected from the group consisting of glass plate, porous body, woven fabric and unwoven fabric.

* * * * *